United States Patent
Uemura

(10) Patent No.: US 7,418,201 B2
(45) Date of Patent: Aug. 26, 2008

(54) FLASH APPARATUS, CAMERA PROVIDED WITH FLASH APPARATUS, SEMICONDUCTOR LASER DEVICE, AND METHOD OF MANUFACTURING THE SAME

(75) Inventor: Hiroki Uemura, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 155 days.

(21) Appl. No.: 11/041,026

(22) Filed: Jan. 21, 2005

(65) Prior Publication Data
US 2005/0213958 A1    Sep. 29, 2005

(30) Foreign Application Priority Data
Jan. 22, 2004    (JP)    ............... 2004-014730

(51) Int. Cl.
*G03B 15/03*    (2006.01)
(52) U.S. Cl. .............. 396/175; 396/176; 396/182; 396/200; 396/435; 348/371
(58) Field of Classification Search ................ 396/155, 396/175, 182, 200, 435, 436, 176; 348/370, 348/371; 362/3, 11, 13, 16
See application file for complete search history.

(56) References Cited

U.S. PATENT DOCUMENTS

| | | | | |
|---|---|---|---|---|
| 4,866,285 A | * | 9/1989 | Simms | 250/495.1 |
| 6,256,067 B1 | * | 7/2001 | Yamada | 348/370 |
| 6,445,884 B1 | * | 9/2002 | Yahav | 396/106 |
| 2002/0025157 A1 | * | 2/2002 | Kawakami | 396/155 |
| 2003/0180037 A1 | * | 9/2003 | Sommers | 396/155 |
| 2004/0012027 A1 | * | 1/2004 | Keller et al. | 257/79 |
| 2005/0134723 A1 | * | 6/2005 | Lee et al. | 348/370 |

FOREIGN PATENT DOCUMENTS

JP    2003-333155    11/2003

* cited by examiner

*Primary Examiner*—W. B. Perkey
(74) *Attorney, Agent, or Firm*—Morrison & Foerster LLP

(57) ABSTRACT

In an embodiment of a flash apparatus, a semiconductor laser device is used as a flash-use light source. Laser light beams are approximately evenly scattered by a reflector plate whose reflection surface is formed of Ag coarse film, whereby illumination of a wide range and safety are secured. In an embodiment of the semiconductor laser device, the semiconductor laser device is disposed such that a longitudinal direction of an imaging area 20a of a camera and a wide direction of far-field patterns 11a1, 12a1 and 12b1 of laser light emitted from the semiconductor laser device match.

11 Claims, 11 Drawing Sheets

FLASH APPARATUS, CAMERA PROVIDED WITH FLASH APPARATUS, SEMICONDUCTOR LASER DEVICE, AND METHOD OF MANUFACTURING THE SAME

This application claims priority under 35 USC 119(a) to Patent Application No. 2004-14730 filed in Japan on Jan. 22, 2004, the content of which is hereby incorporated herein by reference in its entirety.

BACKGROUND OF INVENTION

1. Field of Invention

The present invention relates to a flash apparatus using a semiconductor laser device, a camera provided with the flash apparatus, a semiconductor laser device used in the flash apparatus, and a method of manufacturing the semiconductor laser device.

2. Conventional Art

Conventionally, halogen lamps and xenon tubes have been used as light sources in flash apparatuses used in test equipments and cameras. In such flash apparatuses, a capacitor is precharged. By discharging the capacitor once, the halogen lamp or xenon tube is made to emit light, whereby strong illumination light is obtained. However, with halogen lamps and xenon tubes, there have been problems in terms of the shortness of the lifespan, heat emission and high power consumption.

Thus, an illumination apparatus has been proposed that uses a light-emitting diode, whose power consumption is low and which has a long lifespan. This illumination apparatus eliminates unevenness of the illumination distribution resulting from each time the light-emitting diode is a point source of light (e.g., see Japanese Patent Application Laid-Open Publication (JP-A) No. 8-247929).

This illumination apparatus includes: a light reflector that is formed in a substantially rectangular parallelepiped shape, with light-reflecting surfaces being formed on four surfaces thereof excluding a light-incident surface and a light-emission surface at a position facing the light-incident surface; a plurality of light-emitting means whose optical axes are disposed facing the light-incident surface of the light reflector; light-diffusing means disposed at a position facing the light-emission surface of the light reflector; and a polarizing plate that changes the light leaving the light reflector and passing through the light-diffusing means to linearly polarized light.

However, when a light-emitting diode is used as the light source of an illumination apparatus as in the conventional technology described above, sometimes sufficient light output is not obtained.

SUMMARY OF INVENTION

It is an object of the present invention to provide: a flash apparatus that can realize low power consumption, a long lifespan and high output by using a semiconductor laser; a camera provided with the flash apparatus; a semiconductor laser device; and a method of manufacturing the semiconductor laser device.

The flash apparatus of the present invention is a flash apparatus used in a camera, comprising at least one semiconductor laser device acting as a flash-use light source.

The semiconductor laser device here is a semiconductor laser device where one or more semiconductor laser elements (laser diode chips, etc.) are disposed inside a package, but the semiconductor laser device is not limited to this.

According to the flash apparatus of the present invention, illumination of low power consumption, a long lifespan and high output can be obtained by using a semiconductor laser.

In the flash apparatus of the present invention, the semiconductor laser device may be disposed such that a longitudinal direction of an imaging area of the camera employing the flash apparatus coincides with a wide direction of far-field patterns of laser light emitted from the semiconductor laser device. Furthermore, the camera employing the flash apparatus may be a camera that can be used by switching a film between standard size frames and half size frames, and when the camera is used with the film switched to the half size frames, the laser light emitted from the semiconductor laser device may be rotated approximately 90 degrees around an optical axis thereof, to cause the longitudinal direction of the half size frames to coincide with the wide direction of the far-field patterns of the laser light.

Examples of the camera here include cameras that use film and digital cameras, but the camera is not limited to these. Among cameras that use film, there are cameras where it is possible to switch the film to standard size frames or half size frames. The intensity distribution of laser light emitted from a semiconductor laser element has a cross-sectionally ellipsoidal shape, but the way the intension distribution spreads according to direction is different between the near-field pattern and the far-field pattern. Namely, in the near-field pattern, the intensity distribution is wider in the direction parallel to the bottom surface of the semiconductor laser element, but in the far-field pattern, the intensity distribution becomes wider in the direction orthogonal to the bottom surface of the semiconductor laser element. Thus, when the film is used with standard size flames, the long sides of the standard size frames line up along the side ends of the film, so that in order to appropriately illuminate the imaging range, the long sides of the standard size frame should match the wide sides of the far-field pattern. For this reason, the semiconductor element should be disposed in the flash apparatus so that the bottom surface of the semiconductor laser element is orthogonal to the direction of the side ends of the film.

According to the flash apparatus of this invention, the longitudinal direction of the imaging area of the camera in which the flash apparatus is used and the wide direction of the far-field patterns of the laser light match. Thus, the laser light can be effectively used. Thus, the imaging range can be evenly illuminated as much as possible.

In the flash apparatus of the present invention, the semiconductor laser device may emit a plurality of laser light beams having different wavelengths.

Here, in order to emit a plurality of laser light beams of different wavelengths with the semiconductor laser device, a plurality of semiconductor laser elements may be disposed in the semiconductor laser device. These semiconductor laser elements may be elements that emit laser light beams of different wavelengths, or at least one may be a monolithic two-wavelength laser, but the configuration is not limited to these configurations. Also, it is preferable for the plurality of semiconductor laser elements disposed in the semiconductor laser device to be disposed as closely together as possible inside the package of the semiconductor laser device.

According to this invention, the necessary white light can be obtained for the flash by combining and synthesizing the plurality of laser light beams of different wavelengths. When a plurality of semiconductor laser elements disposed in the semiconductor laser device are disposed as closely together as possible inside the package of the semiconductor laser device, a wider region can be illuminated with the white light.

In the flash apparatus of the present invention, the semiconductor laser device may be pulse driven.

Here, a semiconductor laser has strong coherence, and its light-emitting surface has a wavy shape when seen microscopically. Emitted light is also reflected by the wavy surface and visible fluctuations arise in the light, so that when a plurality of laser light beams are synthesized, there is the possibility for the resultant light to be of an uneven color.

According to the flash apparatus of this invention, the coherence can be controlled by driving the laser in pulses. Thus, white light in which unevenness is controlled can be obtained.

The flash apparatus of the present invention may further comprise at least one laser light scattering member that approximately evenly scatters laser light emitted from the semiconductor laser device.

Here, examples of the laser light scattering member include a reflector plate whose reflection surface is formed of Ag coarse film, but the laser light scattering member is not limited thereto.

According to the flash apparatus of this invention, the laser light emitted from the semiconductor laser device are approximately evenly scattered. Thus, a wide range can be evenly illuminated as much as possible, and safety with respect to the human body can be secured.

In the flash apparatus of the present invention, the reflector plate may be coated with a is plurality of types of phosphors that are excited by the laser light emitted from the semiconductor laser device and that emit red, green and blue fluorescent light beams respectively.

Here, the plurality of types of phosphors may be applied in stripes in a repeating predetermined order. In this case, it is preferable for the wide direction of the far-field patterns of the laser light emitted from the semiconductor laser device and the extending direction of the stripe regions where the plurality of types of phosphors are applied to match.

According to this invention, the plurality of types of phosphors applied to the reflector plate are excited by the laser light and emit red, green and blue fluorescent light beams respectively, and these fluorescent light beams are synthesized to obtain white light. Thus, flash-use white light can be obtained from laser light of a single wavelength, such as blue. When a plurality of types of phosphors are applied in stripes in a repeating predetermined order and the extending direction of the stripe regions and the wide direction of the far-field patterns of the laser light match, the laser light can be used effectively and a wider region of white emission light can be obtained.

In the flash apparatus of the present invention, the semiconductor laser device may include at least one hexagonal laser element. Furthermore, the semiconductor laser device may include a plurality of reflector members, and the laser light beams emitted from the six sides of the hexagonal laser element may be emitted directly to the outside or the directions of the laser light beams may be changed by reflection by the reflector members so that the laser light beams are emitted to the outside, whereby approximately all of the laser light beams emitted from the six sides of the hexagonal laser element are emitted to the outside.

Here, examples of the hexagonal laser element include a blue sapphire hexagonal laser element, but the hexagonal laser element is not limited to this. Also, the reflector members may be emission direction converging mirrors that give mirror functions to a reflector plate.

According to the flash apparatus of this invention, at least one hexagonal laser element, where the efficiency of laser oscillation is high, is used, and the laser light beams emitted from the six sides of the hexagonal laser element can all be effectively used. Thus, illumination of higher output or lower power consumption can be realized.

In the flash apparatus of the present invention, the semiconductor laser device may include a plurality of reflector members, and a plurality of types of phosphors that are excited by the laser light emitted from the hexagonal laser element and emit red, green and blue fluorescent light beams may be applied to end surface coats of the hexagonal laser element, and the red, green and blue fluorescent light beams emitted from the phosphors applied to the six surfaces of the hexagonal laser element may be emitted directly to the outside or the directions of the red, green and blue fluorescent light beams may be changed by reflection by the reflector members so that the fluorescent light beams are emitted to the outside, whereby white light beams in which the fluorescent light beams are synthesized are emitted to the outside.

Here, the plurality of types of phosphors can be applied to end surface coats of the size sides of the hexagonal laser element so that the phosphors on opposite sides of the hexagonal laser element emit the same color fluorescent light beams.

According to the flash apparatus of this invention, at least one hexagonal laser element, where the efficiency of laser oscillation is high, is used, the phosphors are excited by the laser light beams emitted from the six sides of the hexagonal laser element, red, green and blue fluorescent light beams are emitted, the fluorescent light beams are synthesized, and white light beams are obtained. Thus, white light illumination of even higher output or lower power consumption can be realized.

In the flash apparatus of the present invention, the semiconductor laser device may include at least one semiconductor laser element, and phosphors that emit fluorescent light of the same color are applied to both end surface coats of the semiconductor laser element.

Here, semiconductor laser elements have a property where laser light beams are emitted from both ends. By making the reflectance of end surface coats of both end surfaces the same, laser light beams are emitted at a ratio of 1:1 from both light-emitting surfaces.

According to the flash apparatus of this invention, the laser light emitted from both end surfaces of the semiconductor laser element can be effectively used, and fluorescent light beams can be emitted by the phosphors applied to the end surfaces.

In the flash apparatus of the present invention, the semiconductor laser device may include at least one first semiconductor laser element including end surface coats coated with a phosphor that emits red fluorescent light, at least one second semiconductor laser element including end surface coats coated with a phosphor that emits green fluorescent light, and at least one third semiconductor laser element including end surface coats coated with a phosphor that emits blue fluorescent light.

Here, the first semiconductor laser element, the second semiconductor laser element and the third semiconductor laser element are not limited to one each, but may be two or more. Also, it is preferable to these to be disposed in proximity to one another inside one package of the semiconductor laser device.

According to the flash apparatus of this invention, red, green and blue fluorescent light beams are emitted from the semiconductor laser elements, and the fluorescent light beams are synthesized to obtain white light beams. When, the semiconductor laser elements are disposed as closely together as possible inside the package, a wide region can be illuminated with the white light beams.

A camera of the invention is a camera provided with a flash apparatus having any of the aforementioned features.

According to the camera of the invention, the camera is provided with a flash apparatus whose power consumption is low, whose lifespan is long and which can illuminate with high output. Thus, the flash photographing performance of the camera can be improved.

The semiconductor laser device of the present invention is a semiconductor laser device including at least one hexagonal laser element and a plurality of reflector members, wherein laser light beams emitted from the six sides of the hexagonal laser element are emitted directly to the outside or the directions of the laser light beams are changed by reflection by the reflector members so that the laser light beams are emitted to the outside, whereby approximately all of the laser light beams emitted from the six sides of the hexagonal laser element are emitted to the outside.

According to the semiconductor laser device of this invention, at least one hexagonal laser element, where the efficiency of laser oscillation is high, is used, and the laser light beams emitted from the six sides of the hexagonal laser element can all be effectively used. Thus, a high-output/low power-consuming light source can be realized.

The semiconductor laser device of the present invention is a semiconductor laser device including at least one hexagonal laser element and a plurality of reflector members, wherein a plurality of types of phosphors that are excited by laser light emitted from the hexagonal laser element and emit red, green and blue fluorescent light beams respectively are applied to end surface coats of the six sides of the hexagonal laser element, and wherein the red, green and blue fluorescent light beams emitted from the phosphors applied to the six sides of the hexagonal laser element are emitted directly to the outside or the directions of the red, green and blue fluorescent light beams are changed by reflection by the reflector members so that the fluorescent light beams are emitted to the outside, whereby white light beams in which the fluorescent light beams are synthesized are emitted to the outside. The plurality of types of phosphors may be applied to the end surface coats of the six sides of the hexagonal laser element so that phosphors on opposite sides of the hexagonal laser element emit fluorescent light beams of the same color.

According to the semiconductor laser device of this invention, at least one hexagonal laser element, where the efficiency of laser oscillation is high, is used, the phosphors are excited by the laser light beams emitted from the six sides of the hexagonal laser element, red, green and blue fluorescent light beams are emitted, the fluorescent light beams are synthesized, and white light beams are obtained. Thus, a high-output/low power-consuming white light source can be realized.

The semiconductor laser device of the present invention is a semiconductor laser device including at least one semiconductor laser element where laser light beams are emitted from both ends, wherein at least one reflector plate that reflects the laser light beams emitted from the semiconductor laser element in the direction of a stem of the semiconductor laser device, to thereby cause the laser light beams to be emitted to the outside, is disposed on the stem.

According to the semiconductor laser device of this invention, the laser light emitted from both ends of the semiconductor laser element can be effectively used. Thus, a high-output/low power-consuming light source can be realized.

The semiconductor laser device manufacturing method of the present invention is a method of manufacturing a semiconductor laser device, the method comprising a first applying step of applying phosphors to both end surface coats of a semiconductor laser element; and a first mounting step of mounting, on a sub-mount, the semiconductor laser element to which the phosphors have been applied to both end surface coats in the first applying step.

According to the manufacturing method of the semiconductor laser device of this invention, a semiconductor laser device can be manufactured where the laser light emitted from both end surfaces of the semiconductor laser element are effectively used and where fluorescent light beams can be emitted by the phosphors applied to the end surfaces.

The semiconductor laser device manufacturing method of the present invention is a method of manufacturing a semiconductor laser device, the method comprising a second applying step of applying a phosphor that emits red fluorescent light on an end surface coat of a semiconductor laser element; a third applying step of applying a phosphor that emits green fluorescent light on an end surface coat of a semiconductor laser element; a fourth applying step of applying a phosphor that emits blue fluorescent light on an end surface coat of a semiconductor laser element; and a second mounting step of mounting, on a sub-mount, the semiconductor laser element to which the phosphor emitting the red fluorescent light has been applied in the second applying step, the semiconductor laser element to which the phosphor emitting the green fluorescent light has been applied in the third applying step, and the semiconductor laser element to which the phosphor emitting the blue fluorescent light has been applied the fourth applying step.

According to the manufacturing method of the semiconductor laser device of this invention, a semiconductor laser device can be manufactured where white light beams are obtained as a result of the red, green and blue fluorescent light beams emitted from the semiconductor laser elements being synthesized. When the semiconductor laser elements are mounted as closely together as possible inside the package, a semiconductor laser device that emits white light beams that can illuminate a wider region can be manufactured.

DESCRIPTION OF PREFERRED EMBODIMENTS

Embodiments of the present invention will be described below with reference to the drawings.

First Embodiment

Figure 1:
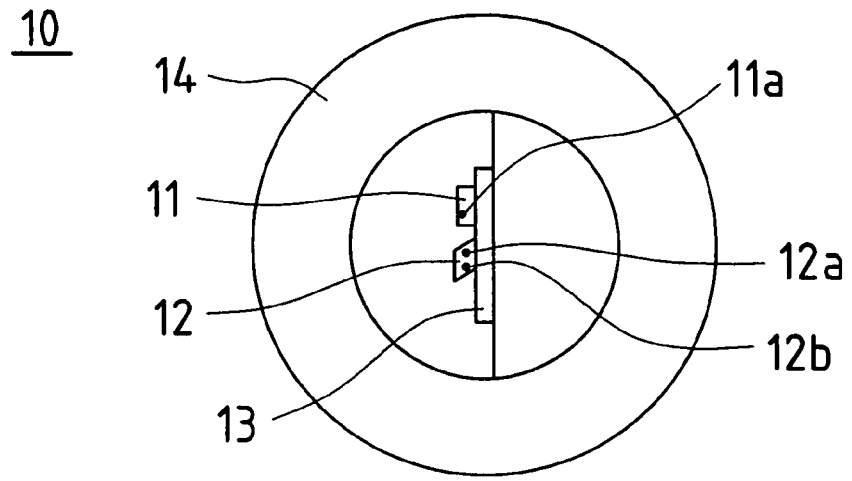
FIG. 1 is a schematic diagram of the internal structure of a semiconductor laser device used in a flash apparatus pertaining to a first embodiment of the invention, and shows a configuration for illuminating a photographing region corresponding to a standard size frame of a film.

FIG. 1 is a schematic diagram of the internal structure of a semiconductor laser device 10 used in a flash apparatus 1 pertaining to a first embodiment of the invention, and shows a configuration for illuminating a photographing region corresponding to a standard size frame of a film.

As shown in FIG. 1, a tabular sub-mount 13 (heat sink) is vertically disposed in a circular stem 14 of the semiconductor laser device 10. A blue laser chip 11 is mounted on one side surface of an upper portion of the sub-mount 13, and blue laser light (wavelength of 450 nm, GaN) is emitted from a blue laser light-emitting point 11a within the cross section of the blue laser chip 11. A red/infrared two-wavelength monolithic laser 12 is mounted, slightly below the blue laser chip 11, on the side surface of the sub-mount 13 on which the blue laser chip 11 is mounted. Infrared laser light (790 nm, GaAs) is emitted from an infrared laser light-emitting point 12a within the cross section of the red/infrared two-wavelength monolithic laser 12, and red laser light (657 nm, InGaAlP) is emitted from a red laser light-emitting point 12b.

It is preferable for the blue laser chip 11 and the red/infrared two-wavelength monolithic laser 12 to be mounted as closely as possible.

Figure 2:
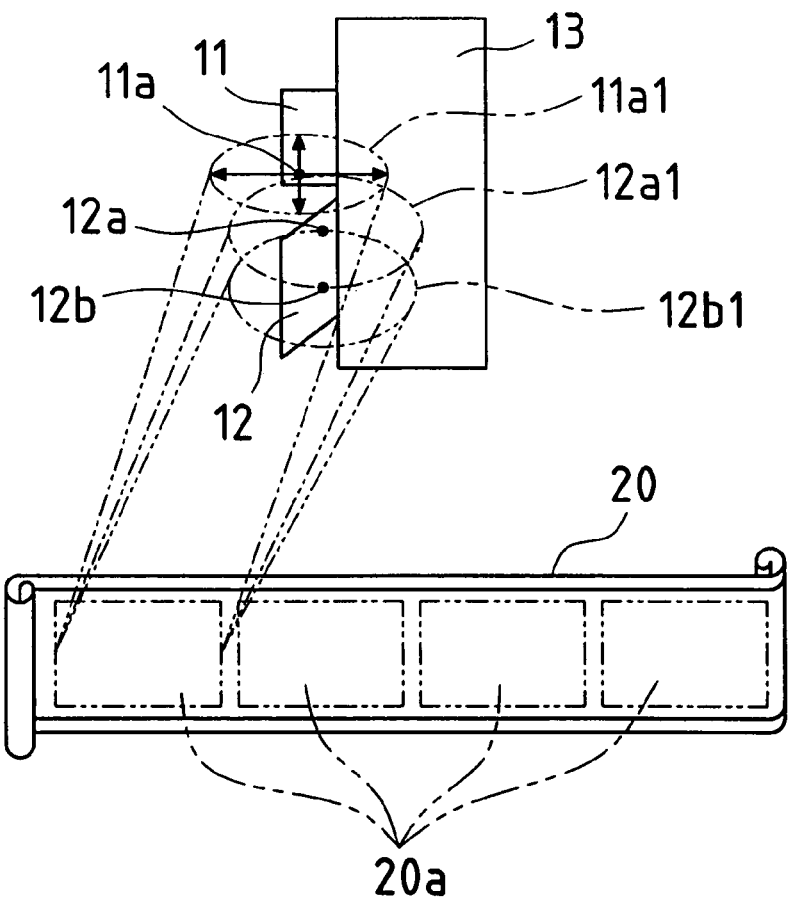
FIG. 2 is a diagram describing the relationship between the standard size frames of the film and a laser light irradiation pattern resulting from the semiconductor laser device used in the flash apparatus pertaining to the first embodiment of the invention.
Figure 3:
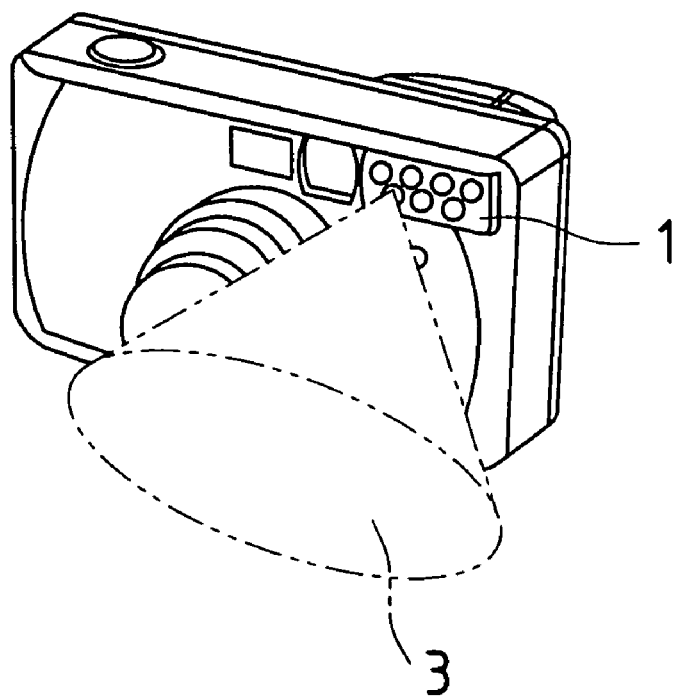
FIG. 3 is an external view of a camera provided with the flash apparatus pertaining to the first embodiment of the invention, and shows a flash light irradiation pattern when the film is used with the standard size flames.

FIG. 2 is a diagram describing the relationship between standard size frames 20a of a film 20 and a laser light irradiation pattern resulting from the semiconductor laser device 10 used in the flash apparatus 1 pertaining to the first embodiment of the invention. FIG. 3 is an external view of a camera 2 provided with the flash apparatus 1 pertaining to the first embodiment of the invention, and shows a flash light irradiation pattern 3 when the film 20 is used with the standard size frames 20a.

The near-field pattern of the blue laser light emitted from the blue laser light-emitting point 11a of the blue laser chip 11 is a wide ellipse in the vertical direction, but a far-field pattern 11a1 is a wide ellipse in the horizontal direction, as shown in FIG. 2. Similarly, a far-field pattern 12a1 of the infrared laser light emitted from the infrared laser light-emitting point 12a of the red/infrared two-wavelength monolithic laser 12 and a far-field pattern 12b1 of the red laser light emitted from the red laser light-emitting point 12b are wide ellipses in the horizontal direction. When the film 20 is used with the standard size frames 20a, the long sides of the standard size frames 20a line up along the side ends of the film 20, so the sides in the horizontal direction are long. For this reason, the far-field patterns with the wide ellipsoidal shapes in the horizontal direction are appropriate for evenly illuminating, as much as possible, the photographing range corresponding to the standard size frame 20a.

The camera 2 shown in FIG. 3 is provided with the flash apparatus 1 including the semiconductor laser device 10. When the film 20 is used with the standard size frames 20a, the far-field patterns of the laser light become wide ellipses in the horizontal direction as described above. Thus, the cross section of a flash light irradiation pattern 3 from the flash apparatus 1 becomes an elliptical cone (with the apex being the flash apparatus 1) that is wide in the horizontal direction and evenly illuminates, as much as possible, the photographing range corresponding to the standard size frame 20a.

The camera 2 is configured so that the film 20 can be switched to the standard size frames 20a or half size frames 20b (see FIG. 5) by operating a switch button not shown. This switch mechanism may be electrical or mechanical. Also, in association with the frame switching, the semiconductor laser device 10 disposed in the flash apparatus 1 is rotated 90 degrees using its center as a rotation axis.

Figure 4:
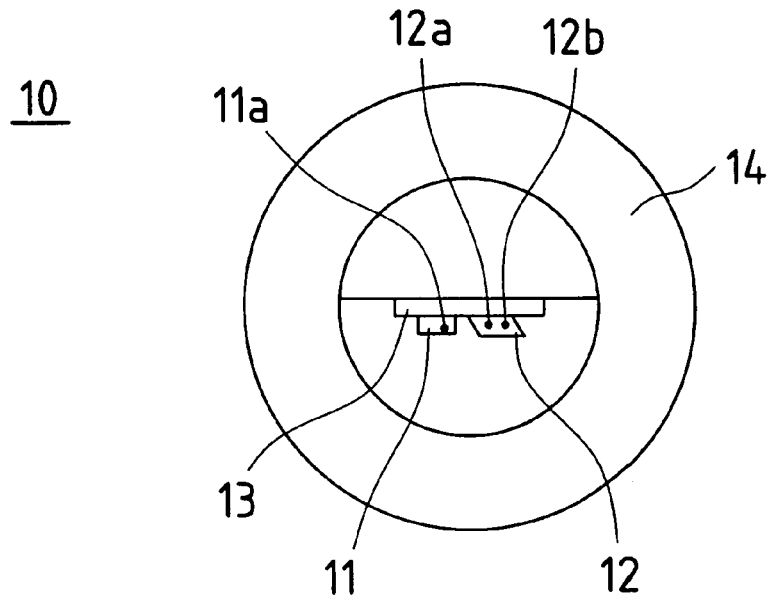
FIG. 4 is a schematic view of the internal structure of the semiconductor laser device used in the flash apparatus pertaining to the first embodiment of the invention, and shows a configuration for illuminating a photographing region corresponding to a half size frame of a film.
Figure 5:
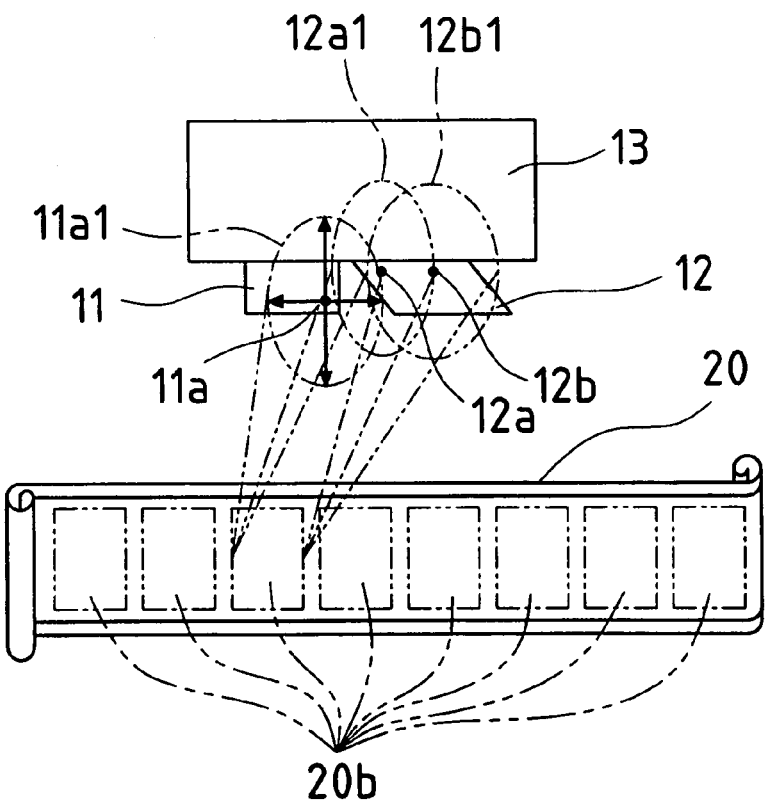
FIG. 5 is a diagram describing the relationship between the half size frames of the film and a laser light irradiation pattern resulting from the semiconductor laser device used in the flash apparatus pertaining to the first embodiment of the invention.
Figure 6:
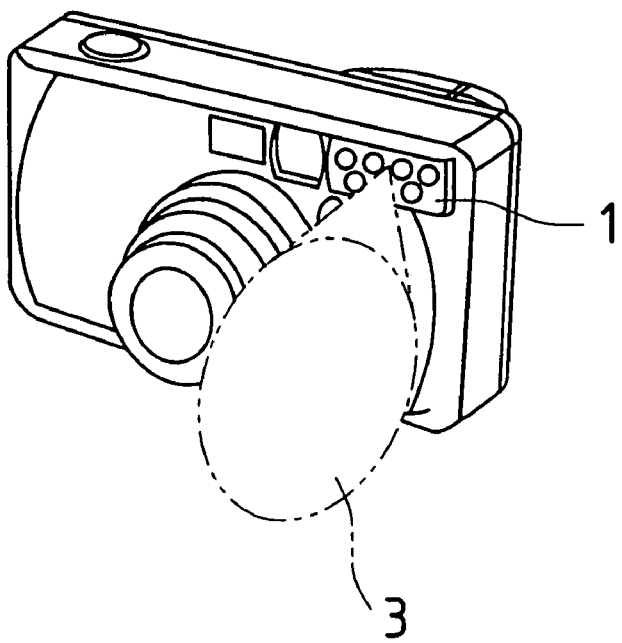
FIG. 6 is an external view of a camera provided with the flash apparatus pertaining to the first embodiment of the invention, and shows a flash light irradiation pattern when the film is used with the half size frames.

FIG. 4 is a schematic view of the internal structure of the semiconductor laser device 10 used in the flash apparatus 1 pertaining to the first embodiment of the invention, and shows a configuration for illuminating a photographing region corresponding to a half size frame of the film. FIG. 5 is a diagram describing the relationship between the half size frame 20b of the film 20 and a laser light irradiation pattern resulting from the semiconductor laser device 10 used in the flash apparatus 1 pertaining to the first embodiment of the invention. FIG. 6 is an external view of the camera 2 provided with the flash apparatus 1 pertaining to the first embodiment of the invention, and shows the flash light irradiation pattern 3 when the film 20 is used with the half size frames 20b.

The configuration of the semiconductor laser device 10 shown in FIG. 4 is in a case where the film 20 is used with the half size frames 20b in the camera 2, and is a state where the semiconductor laser device 10 has been rotated 90 degrees in the counter-clockwise direction from the configuration shown in FIG. 1. The relative positional relationships between the constituent elements in the semiconductor laser device 10 are no different from the case of FIG. 1.

In this case, as shown in FIG. 5, the far-field pattern 11a1 of the blue laser light emitted from the blue laser light-emitting point 11a of the blue laser chip 11 is a wide ellipse in the vertical direction. Similarly, the far-field pattern 12a1 of the infrared laser light emitted from the infrared laser light-emitting point 12a of the red/infrared two-wavelength monolithic laser 12 and the far-field pattern 12b1 of the red laser light emitted from the red laser light-emitting point 12b are wide ellipses in the vertical direction. When the film 20 is used with the half size frames 20b, the short sides of the half size frames 20b line up along the side ends of the film 20, so the sides in the vertical direction are long. For this reason, the far-field patterns with the long ellipsoidal shapes in the horizontal direction are appropriate for evenly illuminating, as much as possible, the photographing range corresponding to the half size frame 20b.

By configuring the camera 2 in this manner, as shown in FIG. 6, the flash light irradiation pattern 3 from the flash apparatus 1 with which the camera 2 is disposed becomes an elliptical cone (with the apex being the flash apparatus 1) that is wide in the horizontal direction and evenly illuminates, as much as possible, the photographing range corresponding to the half size frame 20b.

Figure 7:
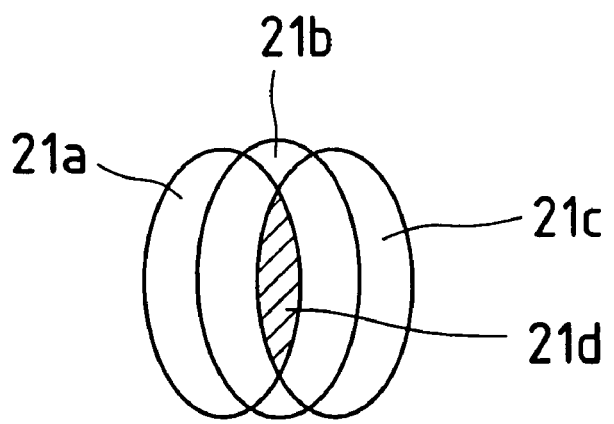
FIG. 7 is a diagram describing a principle where light beams of a plurality of colors are synthesized to create white light for the flash.

FIG. 7 is a diagram describing a principle where light beams of a plurality of colors are synthesized to create white light for the flash.

As shown in FIG. 7, when an ellipsoidal blue light pattern 21a, an ellipsoidal green light pattern 21b and an ellipsoidal red light pattern 21c are present, a white light pattern 21d is obtained in the region (diagonal line portion) where the light of the three patterns overlap as a result of the synthesis of the light of blue, green and red, which are the three primary colors of light. As in the present invention, white light can be similarly obtained in a flash apparatus using a semiconductor laser by synthesizing a plurality of laser light beams of different wavelengths.

It is preferable for the centers of the blue light pattern 21a, the green light pattern 21b and the red light pattern 21c to be as close as possible to each other in order to evenly illuminate, as much as possible, a wide range with the white light pattern 21d, so that the region in which the light of the three patterns overlap is widened.

A semiconductor laser has strong coherence, and its light-emitting surface has a wavy shape when seen microscopically. Emitted light is also reflected by the wavy surface and visible fluctuations arise in the light, so that when a plurality of laser light beams are synthesized, there is the possibility for the resultant light to be of an uneven color. Thus, in order to avoid this problem, a method of controlling the coherence by driving the laser in pulses may be adopted. Alternatively, a method where a laser with low coherence may be disposed to control unevenness after the plurality of laser light beams are synthesized may also be adopted, but the method of controlling the coherence is not limited to these methods. When the laser is pulse-driven, the pulse period may be changed with a laser drive circuit to accommodate the time (e.g., $\frac{1}{100}$ second) when the shutter (not shown) of the camera 2 is open.

Figure 8A:
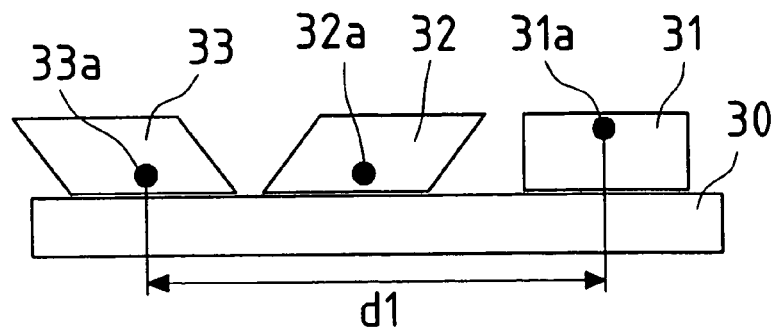
FIG. 8(a) is a diagram showing an example of the configuration of laser chips in the semiconductor laser device, and shows a case where individual laser chips of blue, infrared and red are used.
Figure 8B:
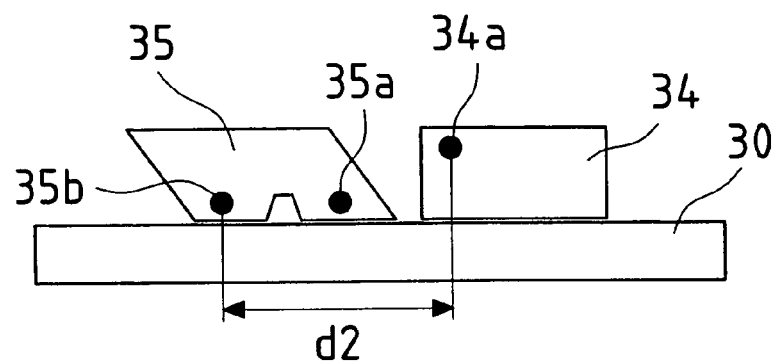
FIG. 8(b) is a diagram showing another example of the configuration of the laser chips in the semiconductor laser device, and shows a case where a blue laser chip and a red/infrared two-wavelength monolithic laser are used.

FIGS. 8(a) and 8(b) are diagrams showing examples of the configuration of laser chips in the semiconductor laser device. FIG. 8(a) shows a case where individual laser chips of blue, infrared and red are used, and FIG. 8(b) shows a case where a blue laser chip and a red/infrared two-wavelength monolithic laser are used. In these diagrams, only the laser chips and the sub-mount are shown.

In the example configuration shown in FIG. 8(a), a blue laser chip 31 that includes a blue laser light-emitting point 31a, an infrared laser chip 32 that includes an infrared laser light-emitting point 32a and a red laser chip 33 that includes a red laser light-emitting point 33a are proximately mounted in this order on a sub-mount 30. In the example configuration shown in FIG. 8(b), a blue laser chip 34 that includes a blue laser light-emitting point 34a and a red/infrared two-wavelength monolithic laser 35 that includes an infrared laser light-emitting point 35a and a red laser light-emitting point 35b are proximately mounted on a sub-mount 30. The distance between the three light-emitting points of the laser is a distance d1 between the blue laser light-emitting point 31a and the red laser light-emitting point 33a in the example configuration of FIG. 8(a), and is a distance d2 between the blue laser light-emitting point 34a and the red laser light-emitting point 35b in the example configuration of FIG. 8(b).

The blue laser light-emitting point 34a of the blue laser chip 34 is disposed not in the vicinity of the width-direction center of the laser chip, but rather towards an end. With respect to infrared and red, the red/infrared two-wavelength monolithic laser 35 is used rather than individual laser chips. For this reason, the distance d2 is shorter than the distance d1. Thus, as described with reference to FIG. 7, a wider region can be illuminated with the white light obtained by the example configuration of FIG. 8(b).

Figure 9:
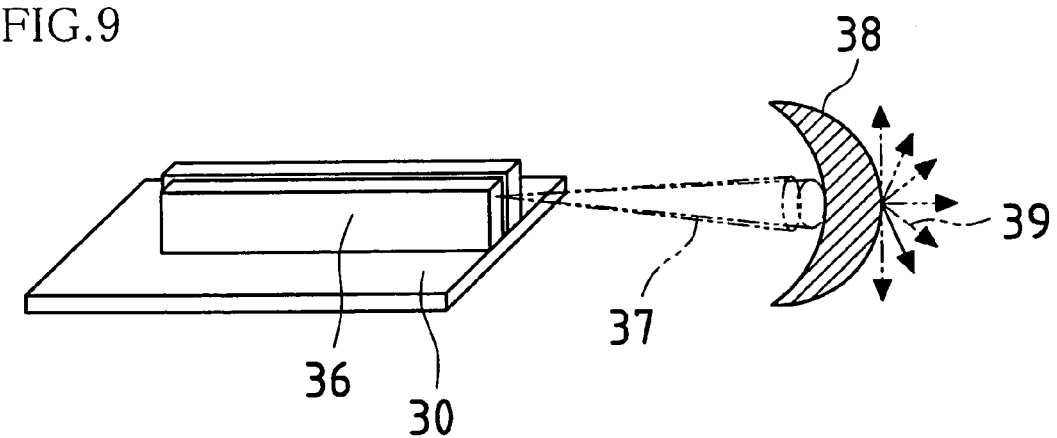
FIG. 9 is a diagram describing a principle where laser light emitted from the semiconductor laser are scattered by a reflector plate.

FIG. 9 is a diagram describing a principle where laser light emitted from the semiconductor laser are scattered by a reflector plate.

Because the output of laser light of a semiconductor laser is extremely strong, there is the possibility for the human body to be adversely affected if a person directly touches or looks directly into the laser light. For this reason, when laser light is used as flash light touching human eyes, it is necessary to use a method to scatter the laser light to ensure that there is no harm.

As shown in FIG. 9, for example, this may be done by using a reflector plate 38 formed of Ag coarse film to scatter laser light 37 emitted from a laser chip 36 mounted on a sub-mount 30. The method used to scatter the laser light is not limited to the reflector plate 38; another diffusion member or scattering method may also be used instead.

By configuring the invention in this manner, the laser light beams 37 are scattered by the reflector plate 38 and become scattered light 39, so that the light is not harmful to the human body.

Second Embodiment

In the first embodiment, a plurality of laser light beams of different wavelengths from a semiconductor laser device were synthesized to obtain white light, and the white light was scattered with a reflector plate to obtain flash light. In the second embodiment, white light is obtained from laser light of a single wavelength by applying, to a reflector plate, three types of phosphors that emit red, green and blue light. Description will be given only in regard to the difference between the second embodiment and the first embodiment because the second embodiment is the same as the first embodiment excluding the point described next.

Figure 10A:
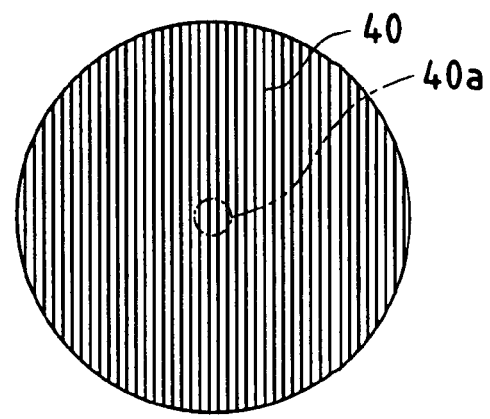
FIG. 10(a) is a schematic diagram showing an example of a laser light diffusion-use reflector plate used in a flash apparatus pertaining to a second embodiment of the invention, and shows the entire reflector plate.
Figure 10B:
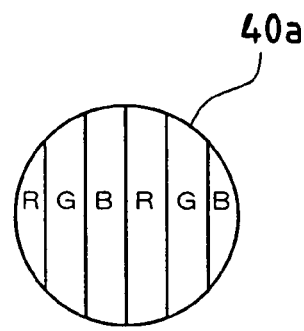
FIG. 10((b) shows an enlargement of part of FIG. 10(a).
Figure 11A:
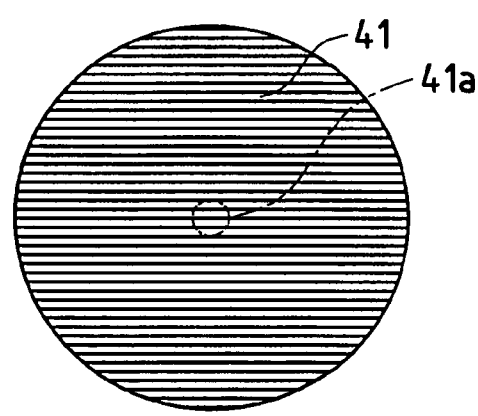
FIG. 11(a) is a schematic diagram showing another example of a laser light diffusion-use reflector plate used in the flash apparatus pertaining to the second embodiment of the invention, and shows the entire reflector plate.
Figure 11B:
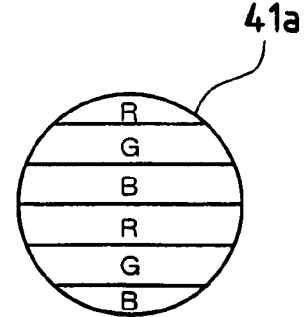
FIG. 11(b) shows an enlargement of part of FIG. 11(a).

FIGS. 10(a) and 10(b) are schematic diagrams showing an example of a laser light diffusion-use reflector plate used in a flash apparatus pertaining to the second embodiment of the invention. FIG. 10(a) shows an entire reflector plate 40, and FIG. 10(b) shows an enlargement of a portion 40a thereof. FIGS. 11(a) and 11(b) are schematic diagram showing another example of a laser light diffusion-use reflector plate used in the flash apparatus pertaining to the second embodiment of the invention. FIG. 11(a) shows an entire reflector plate 41, and FIG. 11(b) shows an enlargement of a portion 41a thereof.

As shown in FIGS. 10(a) and 10(b), three types of phosphors that emit red, green and blue light with laser light of a single wavelength of a semiconductor laser device used in this flash apparatus are applied in extremely fine stripes in the vertical direction on the surface of the reflector plate 40. And as shown in FIGS. 11(a) and 11(b), the same three types of phosphors are applied in extremely fine stripes in the horizontal direction on the surface of the reflector plate 41.

These phosphors are excited by laser light to emit red, green and blue light, and the fluorescent light beams are synthesized to obtain white light.

Figure 12A:
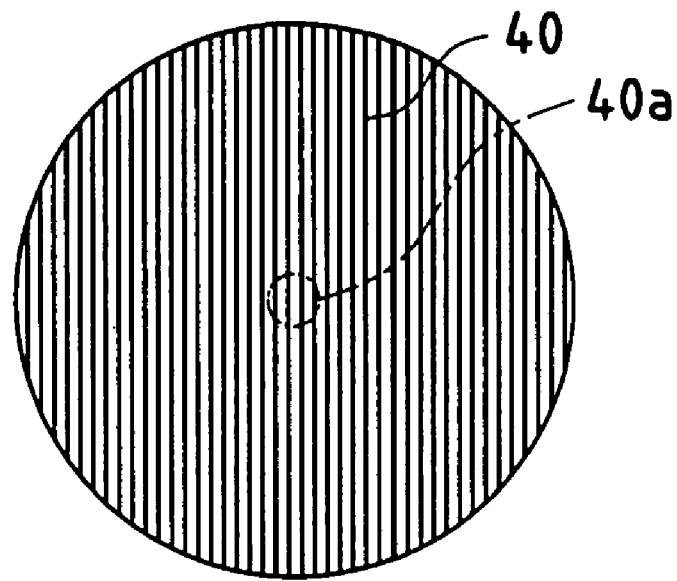
FIG. 12(a) is a diagram describing the relationship between far-field patterns of laser light and application direction of phosphors in the laser light diffusion-use reflector plate used in the flash apparatus pertaining to the second embodiment of the invention, and shows the entire reflector plate.
Figure 12B:
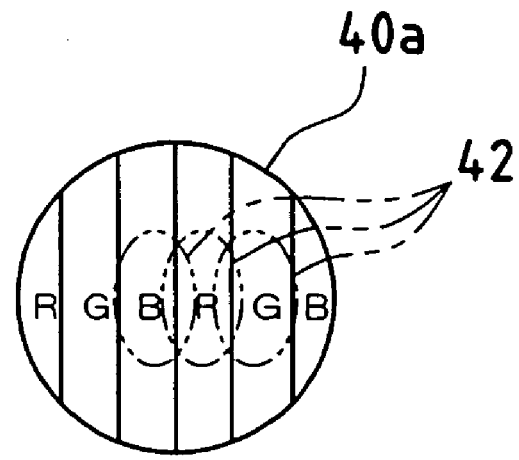
FIG. 12(b) shows an enlargement of part of FIG. 12(a).

FIGS. 12(a) and 12(b) are diagrams describing the relationship between far-field patterns 42 of the laser light and the application direction of the phosphors in the laser light diffusion-use reflector plate 40 used in the flash apparatus pertaining to the second embodiment of the invention. FIG. 12(a) shows the entire reflector plate 40, and FIG. 12(b) shows an enlargement of the portion 40a thereof.

As described with reference to FIGS. 2 and 5, the far-field patterns of the laser light beams are ellipsoidal. For this reason, two cases are broadly conceivable with respect to the relationship between the far-field patterns and the extending direction of the stripe-like phosphors applied to the surface of the reflector plate: a case where the wide direction of the far-field patterns is parallel to the extending direction of the phosphors, and a case where the wide direction of the far-field patterns is orthogonal to the extending direction of the phosphors. Of these, the case that can effectively use the laser light and obtain a wide white light emission region is the case where the wide direction of the far-field patterns 42 is parallel to the extending direction of the phosphors, as shown in FIGS. 12(a) and 12(b).

When the camera provided with the flash apparatus pertaining to the second embodiment of the invention is configured so that the user can switch between using the film with the standard size frames or the half size frames, it is preferable to rotate the semiconductor laser device and the reflector plate 40 disposed in the flash apparatus 90 degrees in association with the frame switching. By configuring the invention in this manner, the laser light can be effectively used even when the film is used with the standard size frames or the half size frames.

Third Embodiment

In the third embodiment, white light is obtained by using a blue sapphire hexagonal laser and synthesizing the blue laser light with fluorescent light from two types of phosphors that emit red and green light as a result of being excited by the blue laser light. Description will be given only in regard to the difference between the third embodiment and the second embodiment because the third embodiment is the same as the second embodiment excluding the point described next.

Figure 13:
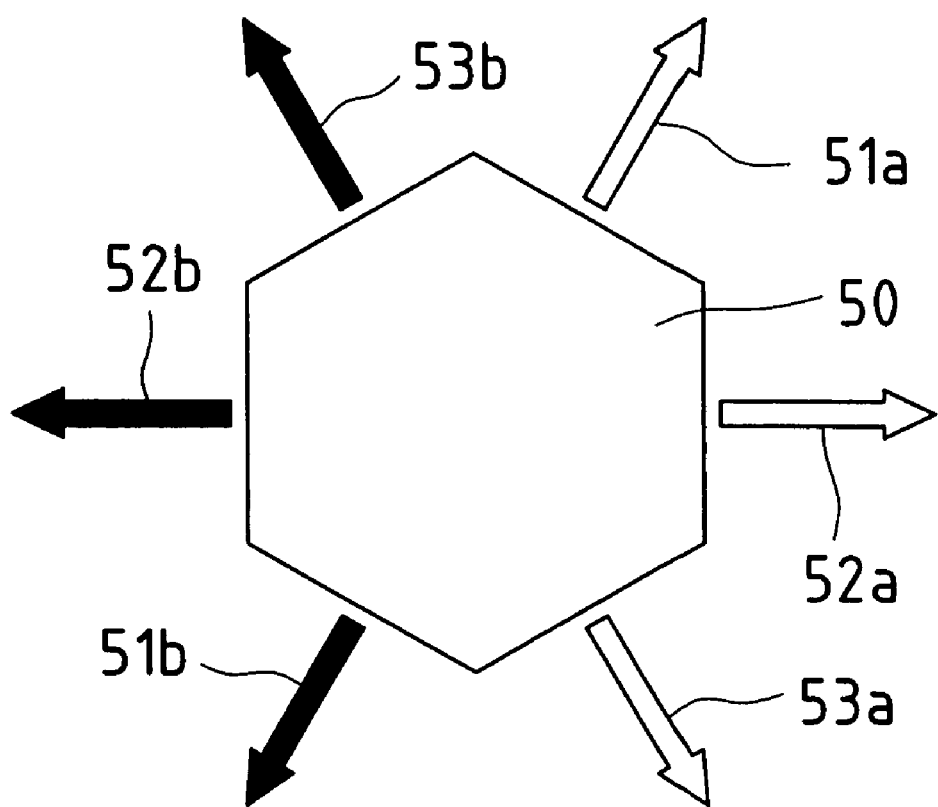
FIG. 13 is a schematic diagram of a blue sapphire hexagonal laser used in a flash apparatus pertaining to a third embodiment of the invention.

FIG. 13 is a schematic diagram of a blue sapphire hexagonal laser 50 used in a flash apparatus pertaining to the third embodiment of the invention.

As shown in FIG. 13, the blue sapphire hexagonal laser 50 has a hexagonal shape and is a crystal including a hexagonal structure obtained by forming GaN on a sapphire substrate. Blue laser light beams 51a, 52a and 53a are emitted from three adjacent surfaces of the blue sapphire hexagonal laser 50, and blue laser light beams 51b, 52b and 53b are emitted from the surfaces opposite from these three surfaces. Namely, blue laser light beams are emitted from the six surfaces of the blue sapphire hexagonal laser 50.

Figure 14:
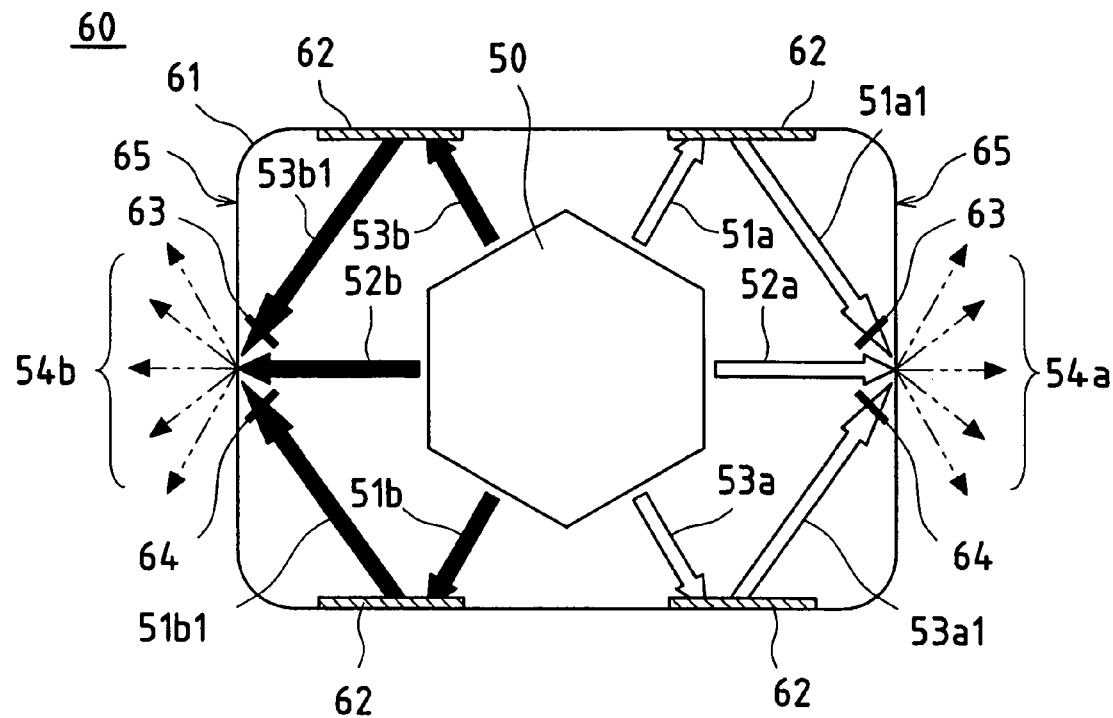
FIG. 14 is a schematic diagram of the internal structure of a semiconductor laser device used in the flash apparatus pertaining to the third embodiment of the invention.

FIG. 14 is a schematic diagram of the internal structure of a semiconductor laser device 60 used in the flash apparatus pertaining to the third embodiment of the invention.

As shown in FIG. 14, the semiconductor laser device 60 includes a box-like package 61, and the blue sapphire hexagonal laser 50 is disposed in the center portion of the package 61. Reflector plates 65 are formed at both side surfaces of the package 61 by applying Ag coarse films.

Emission direction converging mirrors 62 that give the reflector plates a mirror function are disposed at two places on the inner surface of the upper portion of the package 61. The blue laser light beams 51a and 53b emitted in the upper portion direction of the package 61 from the blue sapphire hexagonal laser 50 are reflected towards the centers of the side surfaces of the package 61. Similarly, emission direction converging mirrors 62 are disposed at two places on the inner surface of the lower portion of the package 61. The blue laser light beams 53a and 51b emitted in the lower portion direction of the package 61 from the blue sapphire hexagonal laser 50 are reflected towards the centers of the side surfaces of the package 61. Substrates 63 coated with a red phosphor are disposed on the optical axis of reflection light 51a1 of the blue laser light beam 51a and on the optical axis of reflection light 53b1 of the blue laser light beam 53b respectively. The red phosphors applied to these substrates 63 are excited by the reflection light 51a1 and the reflection light 53b1 and emit red fluorescent light, and the red fluorescent light beams reach the centers of both sides of the package 61. Similarly, Substrates 64 coated with a green phosphor are disposed on the optical axis of reflection light 53a1 of the blue laser light beam 53a and on the optical axis of reflection light 51b1 of the blue laser light beam 51b respectively. The green phosphors applied to these substrates 64 are excited by the reflection light 53a1 and the reflection light 51b1 and emit green fluorescent light, and the green fluorescent light beams reach the centers of both sides of the package 61.

Thus, the blue laser light beams 52a and 52b emitted directly from the blue sapphire hexagonal laser 50, the red fluorescent light beams from the substrates 63 and the green fluorescent light beams from the substrates 64 reach the centers of both side surfaces of the package 61, and these light beams are synthesized to become white light beams. Moreover, the white light beams are scattered by the reflector plates 65 formed at both side surfaces of the package 61, become white scattered light beams 54a and 54b, and are emitted to the outside.

According to the third embodiment described above, because the efficiency of the laser oscillation of the blue sapphire hexagonal laser 50 is high, higher output or lower power consumption illumination can be realized by using the blue sapphire hexagonal laser 50 as a flash-use light source of a flash apparatus.

Fourth Embodiment

In the fourth embodiment, white light is obtained by using a blue sapphire hexagonal laser and synthesizing fluorescent light beams from three types of phosphors that emit red, green and blue light as a result of being excited by the blue laser light. Description will be given only in regard to the difference between the fourth embodiment and the third embodiment because the fourth embodiment is the same as the third embodiment excluding the point described next.

Figure 15:
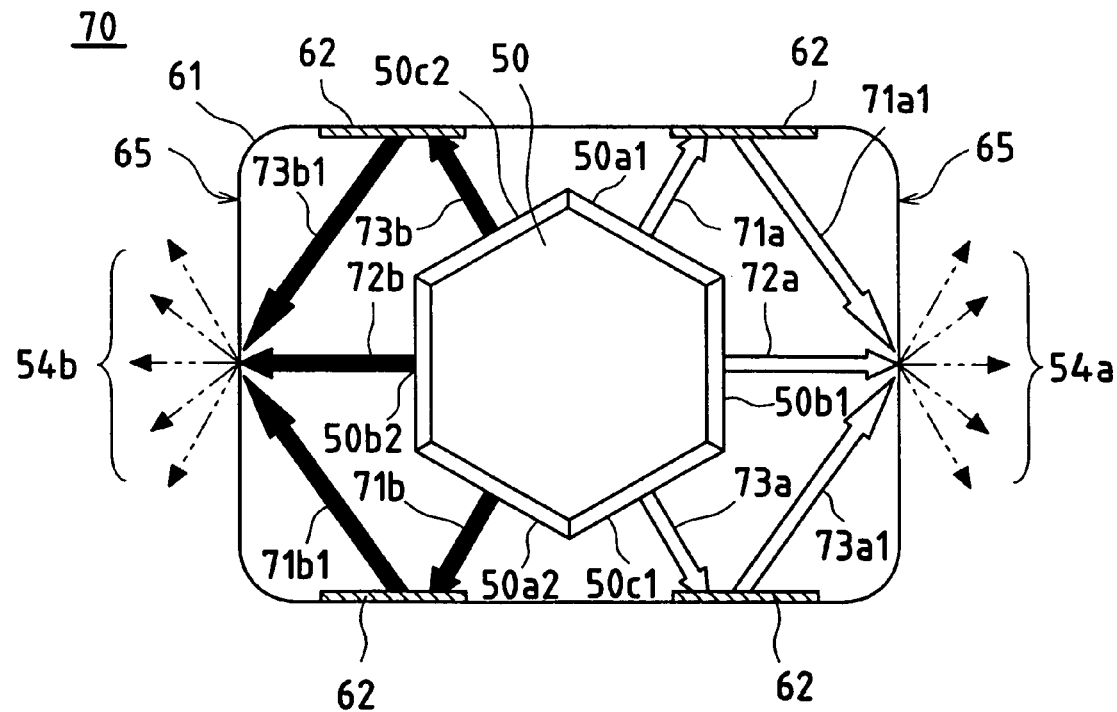
FIG. 15 is a schematic diagram of the internal structure of a semiconductor laser device used in a flash apparatus pertaining to a fourth embodiment of the invention.

FIG. 15 is a schematic diagram of the internal structure of a semiconductor laser device 70 used in a flash apparatus pertaining to the fourth embodiment of the invention. The semiconductor laser device 70 is a device where only part of the semiconductor laser device 60 (see FIG. 14) of the third embodiment has been changed.

As shown in FIG. 15, the blue sapphire hexagonal laser 50 is disposed in the center portion of the package 61 of the semiconductor laser device 70. Three types of phosphors that emit red, green and blue light beams are applied to end surfaces of the blue sapphire hexagonal laser 50 so that opposite end surfaces are coated with the same kind of phosphor. Namely, an end surface 50a1 and an end surface 50a2 are coated with a red phosphor, an end surface 50b1 and an end surface 50b2 are coated with a blue phosphor, and an end surface 50c1 and an end surface 50c2 are coated with a green phosphor.

When blue laser light beams are emitted from the six surfaces of the blue sapphire hexagonal laser 50, red fluorescent light 71a and 71b are emitted from the end surfaces 50a1 and 50a2, and reflection light 71a1 and 71b2 reflected by the emission direction converging mirrors 62 reach the centers of both side surfaces of the package 61. Blue fluorescent light 72a and 72b are emitted from the end surfaces 50b1 and 50b2 and reach the centers of both side surfaces of the package 61 as they are. Green fluorescent light 73a and 73b are emitted from the end surfaces 50c1 and 50c2, and reflection light 73a1 and 73b1 reflected by the emission direction converging mirrors 62 reach the centers of both side surfaces of the package 61.

Thus, fluorescent light beams of the three colors of red, green and blue reach the centers of both side surfaces of the package 61, and these light beams are synthesized to become white light beams. The white light beams are scattered by the reflector plates 65 formed at both side surfaces of the package 61, and similar to the case of the semiconductor laser device 60, the white light beams become white scattered light beams 54a and 54b and are emitted to the outside.

Fifth Embodiment

Figure 16:
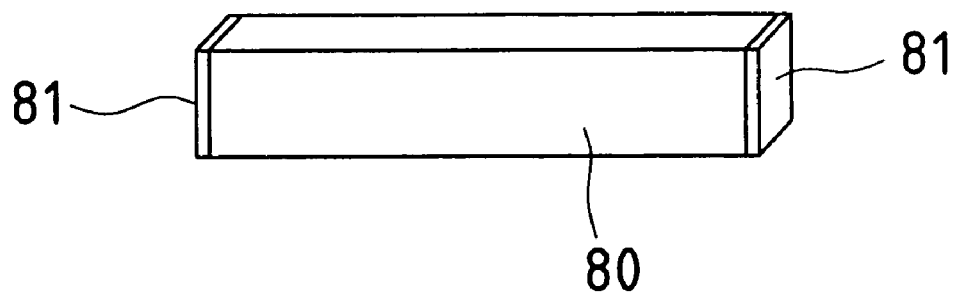
FIG. 16 is a schematic diagram of a laser chip inside a semiconductor laser device used in a flash apparatus pertaining to the fifth embodiment of the invention.
Figure 17:
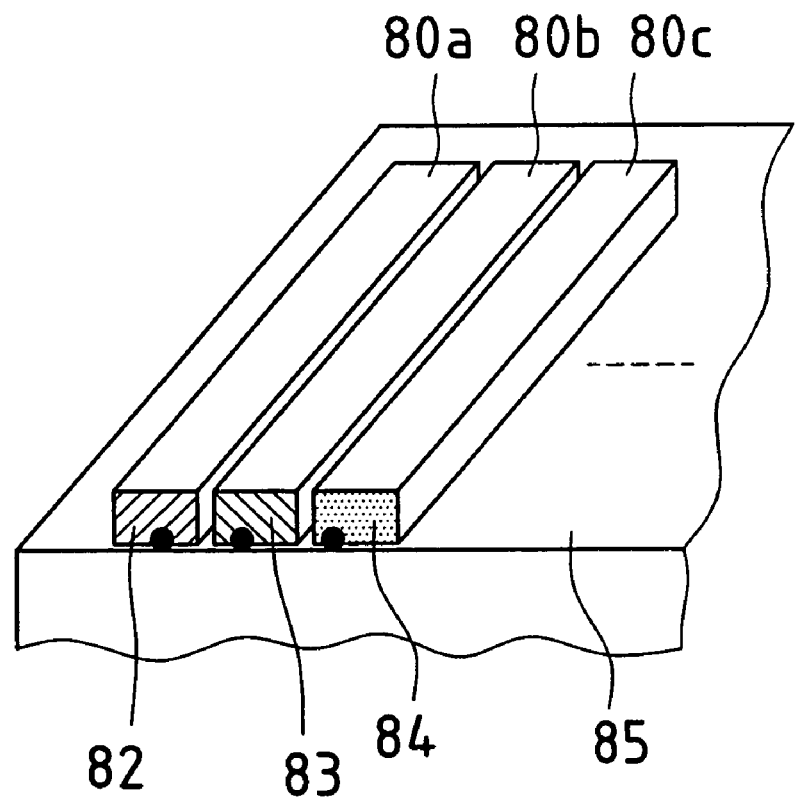
FIG. 17 is a schematic diagram of the inside of the semiconductor laser device used in the flash apparatus pertaining to the fifth embodiment of the invention.

FIG. 16 is a schematic diagram of a laser chip 80 inside a semiconductor laser device used in a flash apparatus pertaining to a fifth embodiment of the invention. FIG. 17 is a schematic diagram of the inside of the semiconductor laser device used in the flash apparatus pertaining to the fifth embodiment of the invention. Description will be given only in regard to the difference between the fifth embodiment and the first embodiment because the fifth embodiment is the same as the first embodiment excluding the point described next.

As shown in FIG. 16, the laser chip 80 has a square bar shape that can emit laser light from both end surfaces, and both end surfaces of the laser chip 80 are coated with phosphors 81. Here, the phosphors 81 emit any one of red, blue or green fluorescent light beams.

The present embodiment uses a property where laser light beams are emitted from both end surfaces of the laser chip 80. By making the reflectance of end surface coats of both end surfaces the same, laser light beams are emitted at a ratio of 1:1 from both light-emitting surfaces. By "end surface coats" here is meant coats administered to the laser, and these are different from the phosphors. End surface coating is itself a known fact.

According to this configuration of the laser chip 80, fluorescent light beams corresponding to the phosphor type can be emitted from both end surfaces of the laser chip 80. By changing the phosphor type, the color of the fluorescent light beams that are emitted can also be changed.

Also, white light can be obtained by using a plurality of laser chips whose end surfaces are coated with different types of phosphors. For example, as shown in FIG. 17, the invention can be configured so that a laser chip 80a whose end surfaces are coated with red phosphors 82, a laser chip 80b whose end surfaces are coated with blue phosphors 83 and a laser chip 80c whose end surfaces are coated with green phosphors 84 are mounted in proximity to one another on a sub-mount 85.

The positions of the light-emitting points in the end surfaces of the laser chips 80a, 80b and 80c are different. These laser chips are disposed so that the intervals between the three light-emitting points are minimal. Also, whether to apply three types of phosphors to the laser chips is optional, and it is not necessary to arrange them in the same order as that shown in FIG. 17. The number of laser chips is also not limited to three and may be increased.

Sixth Embodiment

Figure 18:
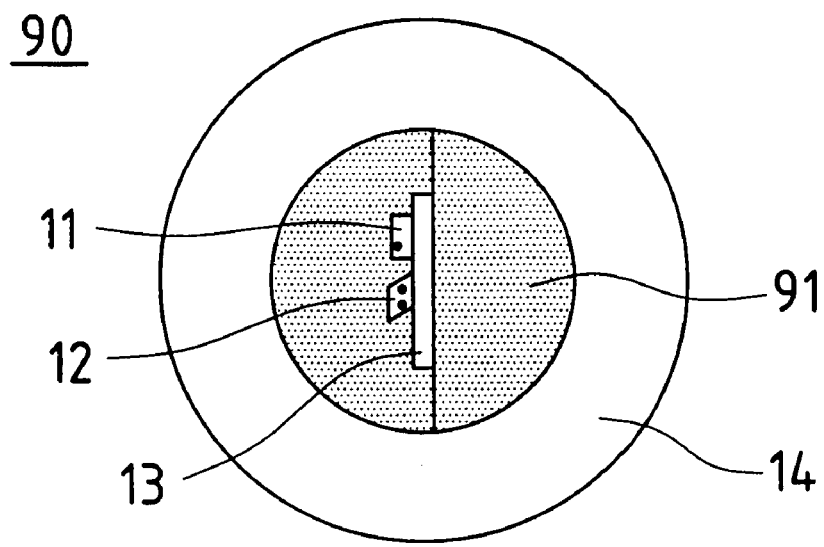
FIG. 18 is a schematic diagram of the internal structure of a semiconductor laser device used in a flash apparatus pertaining to a sixth embodiment of the invention.

FIG. 18 is a schematic diagram of the internal structure of a semiconductor laser device 90 used in a flash apparatus pertaining to a sixth embodiment of the invention. Description will be given only in regard to the difference between the sixth embodiment and the first embodiment because the sixth embodiment is the same as the first embodiment excluding the point described next.

As shown in FIG. 18, a circular reflector plate 91 that is smaller than the circular stem 14 of the semiconductor laser device 90 is concentrically disposed on the stem 14. Laser light emitted from the rear surface side of the blue laser chip 11 and the red/infrared two-wavelength monolithic laser 12 mounted on the sub-mount 13 is reflected/scattered by the reflector plate 91.

According to this configuration, not only the laser light emitted from the front surface side of the laser chip but also the laser light emitted from the rear surface side can be effectively used. Thus, higher output or lower power consumption illumination can be realized by using the semiconductor laser device 90 as a flash-use light source in a flash apparatus.

Seventh Embodiment

Figure 19:
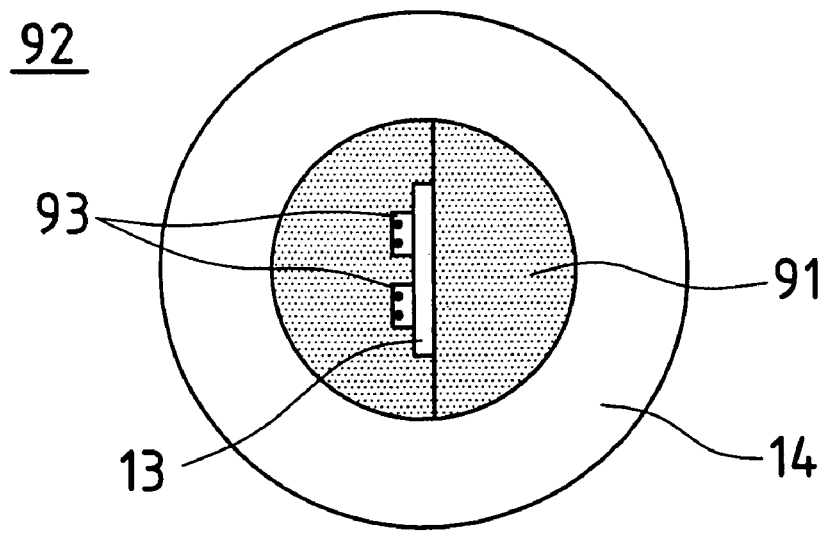
FIG. 19 is a schematic diagram of the internal structure of a semiconductor laser device used in a flash apparatus pertaining to a seventh embodiment of the invention.

FIG. 19 is a schematic diagram of the internal structure of a semiconductor laser device 92 used in a flash apparatus pertaining to a seventh embodiment of the invention. The same reference numerals will be given to the same constituent members and description will be given only in regard to the difference between the seventh embodiment and the sixth embodiment because the seventh embodiment is the same as the sixth embodiment excluding the point described next.

As shown in FIG. 19, two blue two-channel monolithic lasers 93 are mounted in proximity on the sub-mount 13 of the semiconductor laser device 92. The laser light emitted from the rear surface sides of these blue two-channel monolithic lasers 93 is reflected/scattered by the reflector plate 91 disposed on the stem 14.

According to this configuration, the output of the blue laser light is improved, and the distance between the light-emitting points is made small so that a white light source with excellent evenness can be created. Also, because the laser light emitted from both surfaces of the laser chips can be effectively used, even higher output or lower power consumption illumination can be realized by using the semiconductor laser device 92 as a flash-use light source in a flash apparatus.

The present invention can be implemented in various other ways without departing from the spirit or salient characteristics thereof. Thus, the preceding embodiments are given only for the purpose of illustration and should not be limitedly construed. The scope of the invention is defined by the claims and is not restricted by the specification. Moreover, all modifications and changes belonging to a scope equivalent to the scope of the claims are included within the scope of the claims.

What is claimed is:

1. A flash apparatus used in a camera, comprising at least one semiconductor laser device configured as a flash-use light source, wherein the semiconductor laser device is disposed such that a longitudinal direction of an imaging area of the camera employing the flash apparatus coincides with a wide direction of far-field patterns of laser light emitted from the semiconductor laser device, wherein
    the camera employing the flash apparatus is a camera that can be used by switching a film between standard size frames and half size frames, and wherein,
    when the camera is used with the film switched to the half size frames, the laser light emitted from the semiconductor laser device is rotated approximately 90 degrees around an optical axis thereof, to cause the longitudinal direction of the half size frames to coincide with the wide direction of the far-field patterns of the laser light.

2. The flash apparatus according to claim 1, wherein the semiconductor laser device emits a plurality of laser light beams having different wavelengths.

3. The flash apparatus according to claim 2, wherein the semiconductor laser device includes a plurality of semiconductor laser elements that emit laser light beams having different wavelengths.

4. The flash apparatus according to claim 2, wherein the semiconductor laser device includes a plurality of semiconductor laser elements, at least one of which semiconductor laser elements is a monolithic two-wavelength laser.

5. The flash apparatus according to claim 3, wherein the plurality of semiconductor laser elements are disposed in proximity to one another inside one package of the semiconductor laser device.

6. The flash apparatus according to claim 1, further comprising at least one laser light scattering member that approximately evenly scatters laser light emitted from the semiconductor laser device.

7. The flash apparatus according to claim 6, wherein the laser light scattering member is a reflector plate.

8. The flash apparatus according to claim 7, wherein the reflector plate includes a reflection surface formed of Ag coarse film.

9. The flash apparatus according to claim 7, wherein the reflector plate is coated with a plurality of types of phosphors that are excited by the laser light emitted from the semiconductor laser device and emit red, green and blue fluorescent light beams respectively.

10. The flash apparatus according to claim 9, wherein the plurality of types of phosphors are applied in stripes in a repeating predetermined order.

11. The flash apparatus according to claim 10, wherein a wide direction of far-field patterns of the laser light emitted from the semiconductor laser device and an extending direction of the stripe regions coated with the plurality of types of phosphors match.

* * * * *